May 19, 1931.   A. G. KNIGHT, JR   1,806,468
SHOCK ABSORBER
Filed July 2, 1929
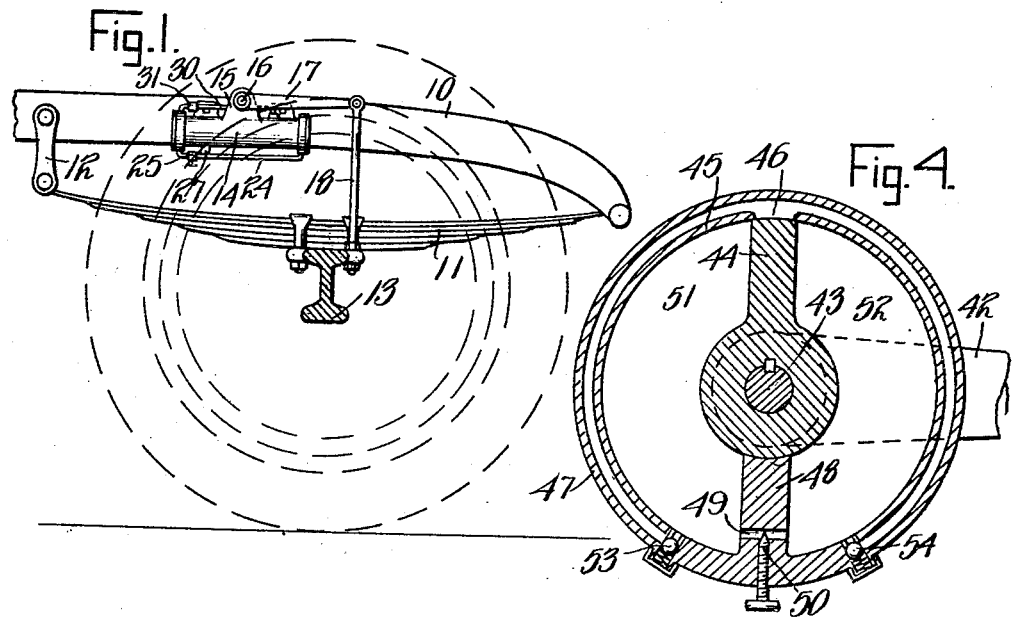
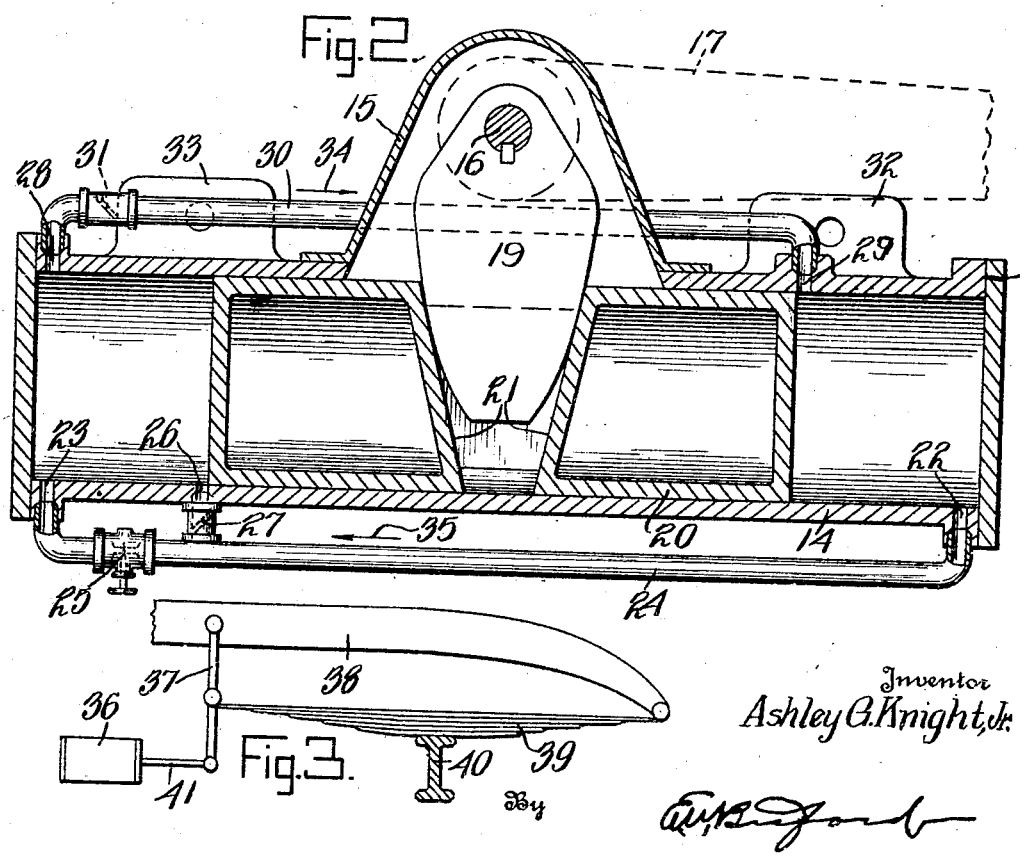
Inventor
Ashley G. Knight, Jr.
By
Attorney Patented May 19, 1931

1,806,463

UNITED STATES PATENT OFFICE

ASHLEY G. KNIGHT, JR., OF KANSAS CITY, MISSOURI

SHOCK ABSORBER

Application filed July 2, 1929. Serial No. 375,546.

This invention relates to shock absorbers. An object of the invention is to provide a shock absorber which is adapted to cushion the shock in both directions. In shock absorbers now in use, movement of the springs is free in one direction, and is cushioned in the opposite direction. This takes care of irregularities in the road only in one direction, either up or down, depending upon which way the shock absorber is mounted to absorb the shock.

My device aims to provide means for absorbing rebound in either direction, and thereby to provide means for eliminating shock to a much greater degree than is possible with devices now in use.

Referring to the accompanying drawings, which are made a part hereof, and on which similar reference characters indicate similar parts, Figure 1 is a side elevation of a portion of a motor vehicle, showing my device applied thereto, Figure 2 is a longitudinal sectional view through the shock absorber device, Figure 3 is a side elevation of a portion of a motor vehicle, showing a modified form of the invention applied thereto, and Figure 4 is a sectional view of a further modified form of the shock absorbing cylinder.

In the drawings, numeral 10 indicates a portion of the frame of a motor vehicle, having a spring 11 mounted at one end of the frame and mounted at the other end to a link 12, which is pivoted to the frame 10. The spring 11 is secured as usual to an axle 13 of the motor vehicle. Mounted upon the frame element 10 is a cylinder 14. This cylinder has a casing 15 mounted intermediate its ends, in which casing is mounted a shaft 16 to the outer end of which is secured an arm 17. A link 18 connects the outer end of the arm with the axle 13, the link providing operative connection between the spring 11 and the arm 17. On the end of the shaft 16 within the housing 15 is keyed an arm 19. Reciprocably mounted within the cylinder 14 is a plunger 20. This plunger is provided at its intermediate portion with a socket 21 into which the depending arm 19 engages so that movement of the arm 17 will reciprocate the plunger 20 within the cylinder 14. The cylinder 14 has at each end ports 22 and 23 which are connected by means of a pipe 24. A manually adjustable needle valve 25 is provided in the pipe 24. Near one end of the cylinder 14 is a port 26 which is connected to the pipe 24 through a check valve 27. The cylinder 14 also has ports 28 and 29 which are connected by a pipe 30, this pipe also having a check valve 31 intermediate its ends. The cylinder 14 may be provided with flanges 32 and 33 by means of which it is secured upon the frame portion 10. The check valve 31 permits fluid to flow freely through the pipe 30 in the direction of the arrow 34 and the check valve 27 permits fluid to flow freely to the left through the pipe 24 as indicated by the arrow 35. These check valves however prevent fluid from flowing in the reverse direction.

The operation of the device is as follows: When the spring 11 is in the position shown in Fig. 1, the plunger 20 is in intermediate position, as shown in Fig. 2. Movement of the spring 11 in either direction from that in which it is shown in Fig. 1 will move the plunger 20 either to the right or to the left. The plunger may freely move to the right, forcing the fluid out of the right end of the cylinder through the pipe 24, check valve 27, port 26 to the chamber at the left of the piston. The piston however cannot freely return to neutral position because the fluid in the chamber at the left end of the piston must be forced through the restricted needle valve 25. Restriction of the flow of the fluid will check movement of the piston until the piston has assumed its intermediate or neutral position. When the spring moves down the piston is forced to the left, forcing the fluid freely through the pipe 30 to the chamber at the right end of the piston. Its return to neutral position is again checked by the fluid which must flow through the pipe 24 and the restricting valve 25. It will readily be seen therefore, that the rebound of the spring to its neutral position from either a higher or lower position than that which it normally assumes, will be checked. This provides means for absorbing shocks in both directions due to irregularities in the road, such as depressions or bumps.

Fig. 3 shows a modified form of the device, in which a conventional shock absorbing cylinder 36 is used, in which the shock is absorbed in only one direction, the piston being free to move in the other direction. In this case, a link 37 is suspended from one end to a portion 38 of the frame of the vehicle. A spring 39 is secured at one end to the frame and at its other end to the link 37, the spring being secured intermediate its ends upon an axle 40 of the vehicle. The lower end of the link 37 is attached to a piston rod 41. The spring 39 in this case is normally in a horizontal position. Movement of the axle 40 either up or down will flex the spring so as to swing the link 37 to the right, in which direction it may freely move. The fluid in the cylinder 36 checks its movement in the opposite direction. This device therefore absorbs shock in either direction.

A form of the device in which an oscillating piston may be used is shown in Fig. 4. In this case an arm 42 is attached by means of a link to the running gear of a motor vehicle. This arm is secured to a shaft 43, upon which is a piston 44 movable in a cylinder 45. The cylinder has an opening 46 intermediate the stroke of the piston, the opening being just slightly larger than the width of the piston. An outer casing element 47 provides a fluid chamber for the liquid medium used as the cushioning element. A partition 48 has a fluid port 49 therethrough, the port being controlled by a manually operable needle valve 50. The partition 48 and the piston 44 divide the pumping chamber into compartments 51 and 52. These compartments have check valves 53 and 54 which open outwardly. In operation, movement of the running gear downward will swing the arm 42 to swing the piston 44 to the right, in which direction it may freely move, forcing the fluid in the chamber 52 out through the check valve 54. Its return movement however is checked, since the fluid can flow into the chamber 52 only through the needle valve 49. When the piston however has reached its neutral position it will come to a stop, from which neutral position it may again freely move to the left as the arm 42 is moved upward. When moving to the left, fluid is freely forced from the chamber 51 out through the check valve 53. The return movement from this position is checked and limited by the flow of fluid from the chamber 52 to the chamber 51 through the restricted valve 49.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. The combination with a vehicle of a shock absorbing device connected with the body of the vehicle and the axle thereof, the shock absorbing device having one way fluid passages connecting the ends thereof permitting fluid to flow in opposite directions to permit free movement of the body of the car relative to the axle in either direction, one of said fluid passages being further provided with means to check its return to intermediate position whereby shocks may be absorbed in both directions, substantially as set forth.

2. A shock absorbing device for motor vehicles comprising in combination the frame of a motor vehicle and the running gear thereof, a cylinder secured to the frame of the vehicle, a piston in the cylinder, means connecting said piston with the running gear of the vehicle the cylinder being filled with liquid, fluid conduits connecting opposite ends of the cylinder, check valves in said conduits permitting the flow of fluid in one direction through one conduit and the other direction through the other conduit, and an adjustable needle valve in the lower conduit for restricting the flow of fluid in either direction from the opposite ends of the cylinder, substantially as set forth.

3. In a motor vehicle having a frame and a running gear resiliently connected to the frame, means for absorbing vibration between the running gear and the frame comprising a cylinder secured upon the frame, a piston in the cylinder, an arm pivoted upon the cylinder having a depending lug engaging the said piston, means connecting the said arm with the running gear of the vehicle, upper and lower fluid conduits connecting chambers at the opposite ends of the cylinder, means for permitting flow of fluid in one direction through the upper conduit and in the other direction through the lower conduit, and for preventing its return movement through the conduits, and a needle valve in the lower conduit adjacent the end of said cylinder for restricting the flow of fluid in either direction from either end of the cylinder to the other end, substantially as set forth.

4. A shock absorbing device for motor vehicles comprising a cylinder, a piston in the cylinder, means for connecting the cylinder and piston to a motor vehicle, one being connected to the frame and the other to the running gear of the vehicle, the cylinder being filled with liquid, upper and lower conduits connecting each of the ends of said cylinder to a point adjacent the respective opposite ends of said piston, each provided with a one-way valve permitting fluid to flow freely to permit movement of the piston in either direction from a neutral position, said lower conduit extending from the point adjacent the piston end to the end of the cylinder provided with means for checking its movement in the other direction, substantially as set forth.

5. A shock absorbing device for motor vehicles comprising a cylinder, a piston in the cylinder, means for connecting the cylinder and piston to a motor vehicle, one being connected to the frame and the other to the running gear of the vehicle, the cylinder being filled with liquid, upper and lower conduits connecting each of the ends of said cylinder to a point adjacent the respective opposite ends of said piston, each provided with a one-way valve permitting fluid to flow freely to permit movement of the piston in either direction from a neutral position, said lower conduit extending from the point adjacent the piston end to the end of the cylinder provided with means for checking its movement in the other direction, said last-named means comprising a manually operable needle valve, substantially as set forth.

In witness whereof, I have hereunto set my hand at Kansas City, Missouri this 26th day of June, A. D. nineteen hundred and twenty-nine.

ASHLEY G. KNIGHT, Jr.